Sept. 2, 1952          W. AMES          2,608,947
GAUGE
Filed July 31, 1948          3 Sheets—Sheet 1
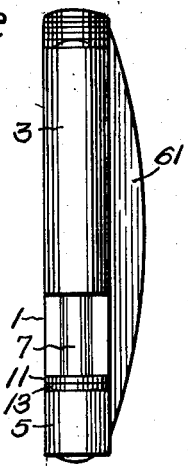
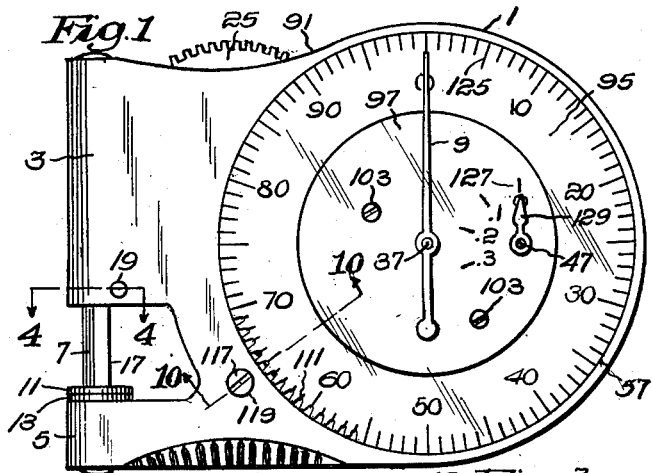
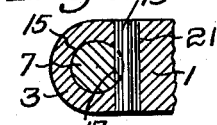
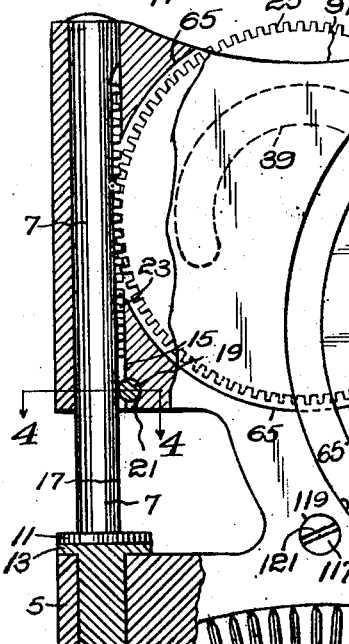
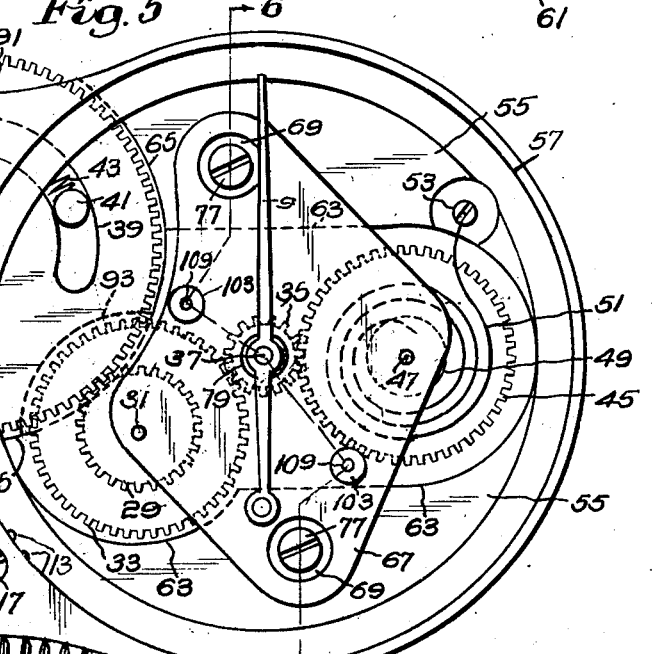
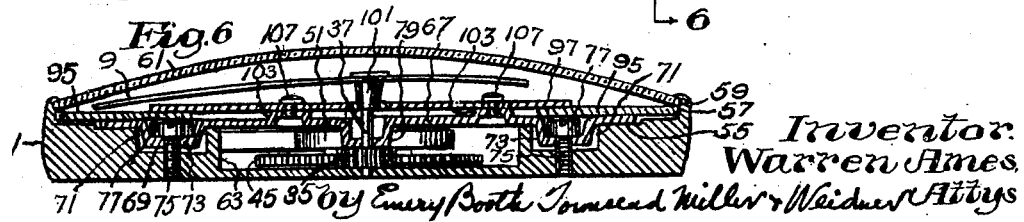
Inventor.
Warren Ames,
by Emery, Booth, Townsend, Miller & Weidner Attys Sept. 2, 1952 W. AMES 2,608,947
GAUGE
Filed July 31, 1948 3 Sheets-Sheet 2
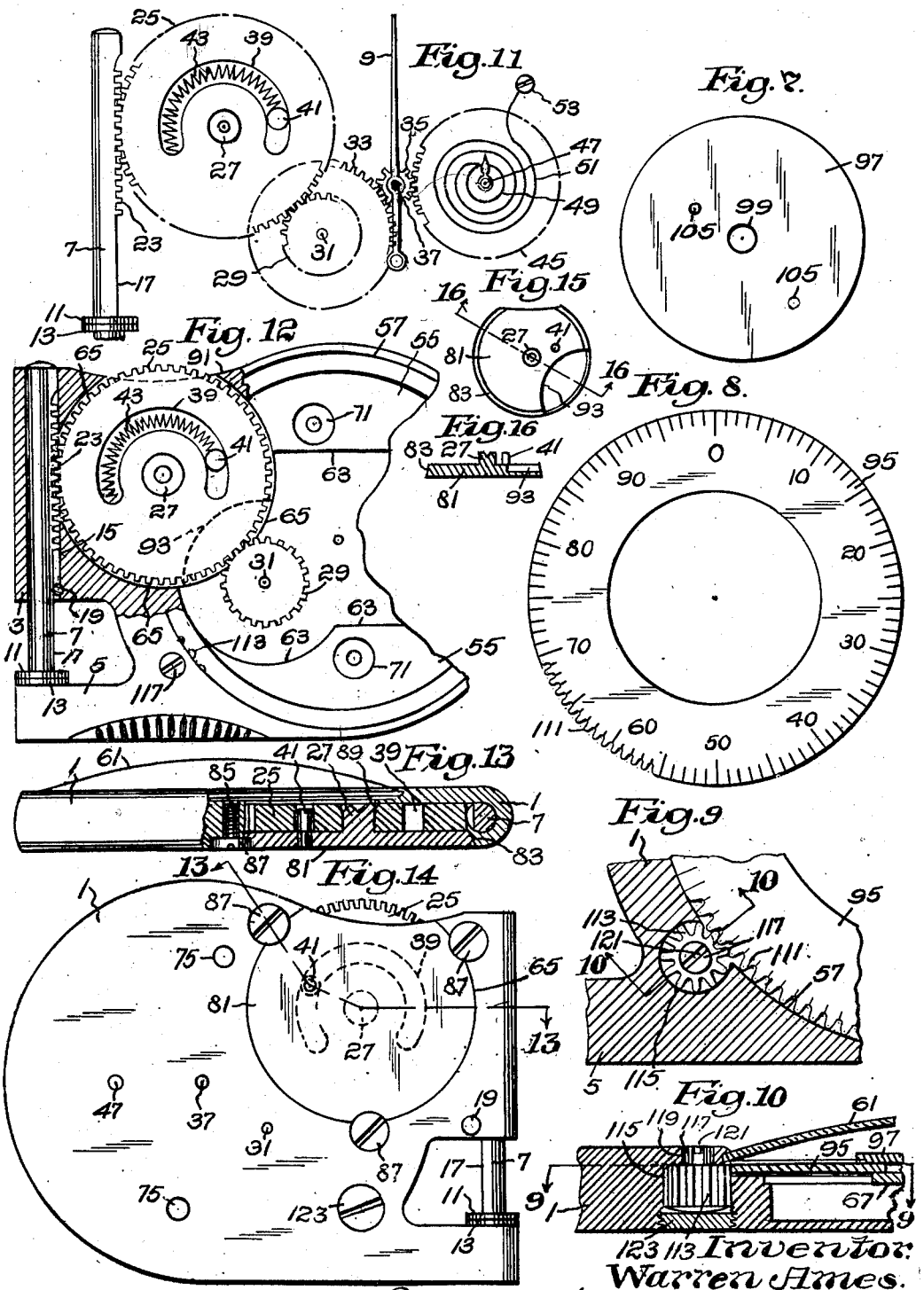
Inventor:
Warren Ames.
By Emery Booth Townsend Miller + Weidner
Attys

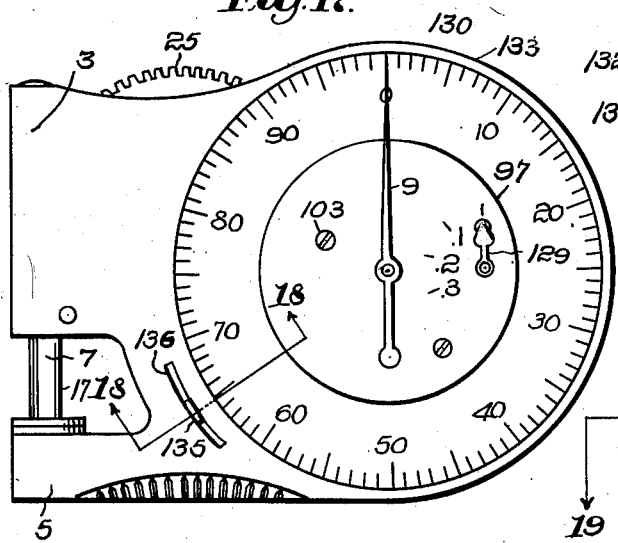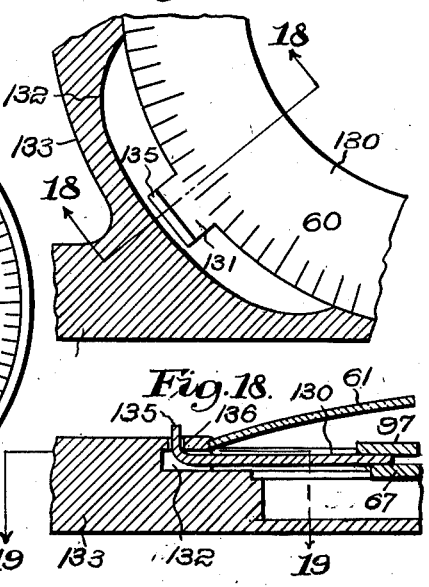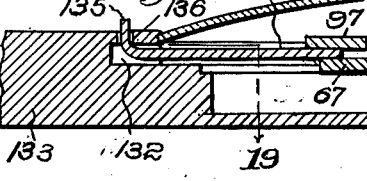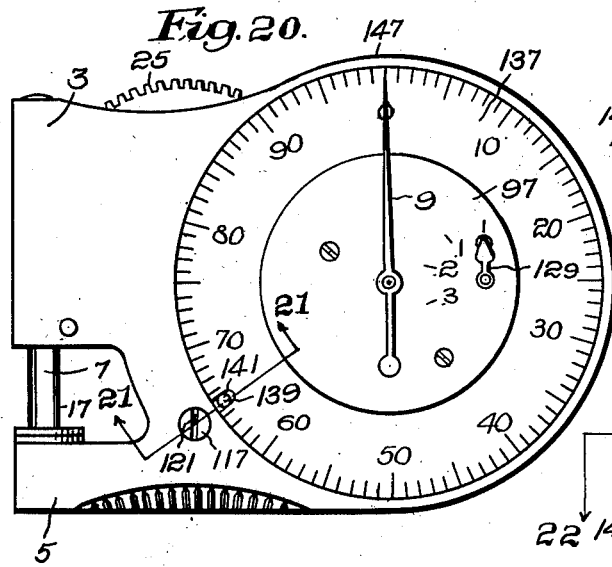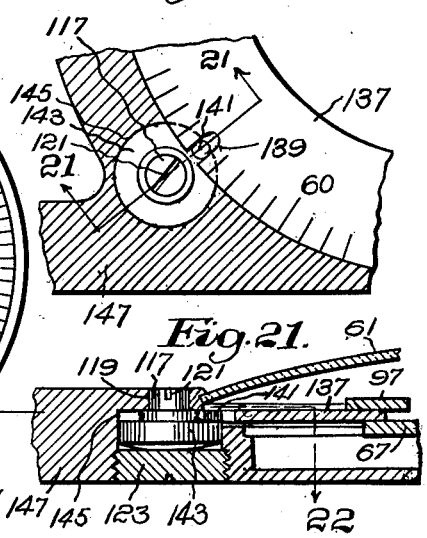

Patented Sept. 2, 1952  2,608,947

UNITED STATES PATENT OFFICE 2,608,947

GAUGE

Warren Ames, Newton, Mass., assignor to B. C. Ames Co., Waltham, Mass., a corporation of Massachusetts Application July 31, 1948, Serial No. 41,751

3 Claims. (Cl. 116—129)

My invention relates to gauges, and particularly, but not exclusively, to those of the dial micrometer type for measuring the thicknesses of work parts.

The invention has among its objects the provision of a gauge having an improved dial construction and improved means for angularly adjusting the dial, a further object being the provision of improved means for actuating the work contacting feeler and indicator hand of a gauge of the dial micrometer type. The invention and other of its objects, however, will be best understood from the following description when read in the light of the accompanying drawings of several specific embodiments of the invention selected for illustrative purposes, while the scope of the invention will be more particularly pointed out in the appended claims.

In the drawings:

Fig. 1 is a front elevation of a gauge according to the invention;

Fig. 2 is an end elevation of the gauge according to Fig. 1 as viewed from the left;

Fig. 3 is a plan of the gauge according to Figs. 1 and 2;

Fig. 4 is a section on the line 4—4 of Fig. 1, the section line 4—4 being also applied to Fig. 5 for convenience in following the drawings;

Fig. 5 is an elevation of the gauge corresponding to Fig. 1, on an enlarged scale, with the crystal, dial, and dial retaining part omitted, and with parts in section;

Fig. 6 is a section on the line 6—6 of Fig. 5, with the crystal, dial, and dial retaining part in assembled relation with the other parts;

Fig. 7 is a plan of the disk-like retaining part of the gauge according to Figs. 1 to 6;

Fig. 8 is a plan of the annular dial of the gauge according to Figs. 1 to 6;

Fig. 9 is a section on the line 9—9 of Fig. 10;

Fig. 10 is a section on the line 10—10 of Fig. 1, on an enlarged scale, the section line 10—10 being also applied to Fig. 9 for convenience in following the drawings;

Fig. 11 is a diagram of the gearing of the gauge according to Figs. 1 to 6;

Fig. 12 is a section on the line 12—12 of Fig. 3, with parts in section, parts omitted, and parts broken away;

Fig. 13 is a section on the line 13—13 of Fig. 14;

Fig. 14 is a rear elevation of the gauge according to Figs. 1 to 3;

Fig. 15 is a plan of a closure plate of the gauge according to the preceding figures;

Fig. 16 is a section on the line 16—16 of Fig. 15;

Fig. 17 is a front elevation of a modified form of gauge according to the invention;

Fig. 18 is a section on the line 18—18 of Fig. 17 on an enlarged scale, the section line 18—18 being also applied to Fig. 19 for convenience in following the drawings;

Fig. 19 is a section on the line 19—19 of Fig. 18, with parts omitted;

Fig. 20 is a front elevation of a further modified form of gauge according to the invention;

Fig. 21 is a section on the line 21—21 of Fig. 20, the section line 21—21 being also applied to Fig. 22 for convenience in following the drawings; and Fig. 22 is a section on the line 22—22 of Fig. 21, with parts omitted.

The gauge illustrated comprises a flattened casing comprising a circular part 1 having at one edge thereof spaced lateral projections 3 and 5. In the projection 3 is reciprocally mounted a contact feeler rod 7 for operating an indicator hand 9 for measuring the thickness of work placed between the contact feeler rod head 11 and the anvil 13, the latter being carried by the projection 5.

As illustrated, the contact feeler rod 7 is reciprocally mounted in an open ended bore 15 in the projection 3 of the gauge casing. The contact feeler rod is shown as provided with a longitudinally extending flattened side 17 which is in sliding contact with a stationary pin 19 fixedly inserted in a perforation 21, which latter intersects the bore 15 transversely thereof in overlapping relation thereto. In this way the contact feeler rod is prevented from rotating relative to the casing.

The gearing of the gauge is schematically illustrated in Fig. 11. As shown in this figure, the contact feeler rod 7 at one side thereof is provided with a row of rack teeth 23 with which meshes a spur gear wheel 25 rotatably mounted on a pin 27 operatively carried by the casing. Meshing with the gear wheel 25 is a pinion 29, of smaller pitch diameter, fixedly carried by a spindle 31 operatively journalled on the casing. The spindle 31 also fixedly carries a gear wheel 33 of larger pitch diameter than the pinion 29. Meshing with the gear wheel 33 is a center pinion 35 fixedly carried by a spindle 37 operatively journalled on the casing. The indicator hand 9 is carried by the spindle 37 so that when the contact feeler rod is moved the motion of the indicator hand will be greatly multiplied. The gear wheel 25, as shown, is formed with an arcuate slot 39 into which extends a pin 41 operatively fixedly carried by the casing. In the slot is a coil compression spring 43 which at one end bears against one end of the slot and at its opposite end against the abutment afforded by the pin. The spring is under initial compression, and hence serves normally to hold the head 11 of the contact feeler rod against the anvil 13, as shown in Fig. 1, and, when the work is positioned on the anvil, to hold the head 11 against the side of the work opposite the anvil so that the thickness of the work will be indicated by the position of the indicator hand. Meshing with the center pinion 35 is an idle or take up gear 45 fixedly mounted on a spindle 47 operatively journalled on the casing. Surrounding the hub 49 of the gear 45 is a light torsion spring 51 which at its inner end is fixedly secured to the hub and its opposite end to a post 53 fixedly carried by the casing. The torsion spring is much lighter than the compression spring 43, and therefore is incapable of moving the gearing in opposition to the force exerted by the latter. The torsion spring through the gear 45 which meshes with the center pinion 35 therefore acts to take up lost motion between the gear teeth of the center pinion and gear wheel 33 and between the gear teeth of the pinion 29 and gear wheel 25, while lost motion between the teeth of this latter gear wheel and the rack teeth on the contact feeler rod is taken up by the compression spring 43.

As illustrated, the gauge casing is formed with a shallow recess which provides the bottom surface 55 (Figs. 5, 6 and 12) and an annular interior wall surface 57 (Figs. 5 and 6). Adjacent its upper edge this annular wall surface is formed with a shallow interior groove 59 into which is snapped the peripheral edge of the stiffly resilient crystal 61 covering said recess. At its central portion the recess has a deepened portion 63 of requisite shape to receive the gear 45 and gear wheel 33, pinions 29 and 35, and torsion spring 51.

At its side opposite the recess just described the casing is formed with a further recess 65 overlapping that recess and intersecting it. In this recess 65 is received the gear wheel 25 which meshes with the pinion 29. Extending across the deepened portion 63 of the first mentioned recess is a bridge-piece 67 (Figs. 5 and 6) formed of sheet metal struck up to form at its under side a pair of spaced cup-like or hollow bosses 69. These bosses are received in depressions 71 in the surface 55, and have bottom perforations 73 (Fig. 6) through which extend screws 75 for securing the bridge-piece to the casing, the heads 77 of the screws being received within the sockets formed by the upper sides of the bosses.

The spindle 37, which carries the indicator hand and center pinion 35, is journalled in the bottom wall of the deepened portion 63 of the depression covered by the crystal and in the bottom wall of a depressed cup-like boss 79 struck up in the bridge-piece, the under side of this boss and the bottom surface of the deepened portion 63 of the depression cooperating with the center pinion to prevent longitudinal movement of the spindle. The spindle 31, carrying the gear wheel 33 and pinion 29, is journalled at opposite ends in the bridge-piece and bottom wall of this deepened portion of the depression, as is likewise the spindle 47 carrying the take up gear 45, any suitable means commonly employed in the art being provided to prevent undue longitudinal movement of these spindles.

The recess 65 of the casing is closed by a plate 81 (Figs. 3 and 13 to 16) at the open side of said recess. This plate about its periphery has external tapered edges 83 (Figs. 3 and 6) seated on complementary shaped internal surfaces at the opening of the recess. The plate is removably secured to the casing by the screws 85 tapped into the casing, these screws having flat heads 87 which overlap the outer surface of the plate adjacent its periphery. The pin 27 on which the gear wheel 25 is rotatably mounted, and the pin 41 which enters the slot 39 in said gear wheel, are carried at the inner side of this plate 81, the outer end of the pin 27 being slightly riveted over, as indicated at 89 (Fig. 13), for retaining the gear wheel on that pin. As shown, the recess 65 intersects the top edge 91 of the casing, so that a peripheral portion of the gear wheel 25 projects from the portion of the casing covered by the plate 81. This projecting portion is adapted to be engaged by the thumb of the hand of the operator that grasps the gauge for rotating the gear wheel so as to raise the contact feeler rod relative to the anvil to permit the work to be inserted between the two. As shown, the plate 81 at its inner edge adjacent one of its outer edges is formed with a recess 93 (Figs. 5, 12, 13 and 14) which receives that portion of the gear wheel 33 which is beneath the gear wheel 25.

The dial 95 of the gauge, as clearly indicated in Figs. 1, 6 and 8, is in the form of a flat annular ring. As shown, the dial at its outer periphery rotatably fits the circular annular wall 57 of the depression covered by the crystal, the dial resting on and being rotatably supported on the bridge-piece 67. For retaining the dial on the bridge-piece is provided a flat disk-like member 97 which is centrally perforated at 99 (Fig. 7) to permit passage therethrough of the center pinion spindle 37 and the hub 101 (Fig. 6) of the indicator hand 9, which hub secures the indicator hand to said spindle. This disk adjacent its outer peripheral edge overlaps the dial at its upper side adjacent its inner peripheral edge. As shown, the bridge-piece at its upper side is formed with raised bosses 103 on the upper surfaces of which the disk-like member 97 rests. For securing the disk-like member to the bridge-piece the disk-like member is provided with perforations 105 (Fig. 7) through which extend screws 107 (Fig. 6) tapped into perforations 109 (Fig. 5) in the bridge-piece.

As illustrated, the dial throughout a portion of its outer peripheral edge is formed with gear teeth 111 (Figs. 1, 8 and 9) with which meshes a pinion 113, this pinion being rotatably mounted in a circular recess 115 laterally intersecting the recess which receives the dial. As illustrated, the pinion has a shank 117 extending through a perforation 119 in the wall of the casing, the exposed end of this shank being provided with a slot 121 for reception of a screw driver bit, the pinion being retained in the recess 115 by a plug 123 screw-threaded into the recess from the side of the casing opposite the shank 117. By use of a screw driver the pinion may be rotated for rotating the dial relative to the casing so as accurately to position the zero mark of the dial under the indicator hand.

The gearing of the gauge and the graduations 125 of the dial cooperating with the indicator hand 9 may be such that each division of said graduations indicates one-thousandth of an inch movement of the contact feeler rod and each complete revolution of said indicator hand 9 indicates one-tenth of an inch movement of said rod, and such that the take up gear 45 rotates one-tenth as fast as said indicator hand 9 so that each division of the graduations 127 of the dial cooperating with the indicator hand 129 carried by the take up gear spindle 47 will indicate one-tenth of an inch movement of the contact feeler rod.

In the gauge according to Figs. 17, 18 and 19 the ring dial 130, corresponding to the ring dial 95 of the gauge hereinbefore described, is provided with a radial projection 131 received in an adjacent arcuate groove 132 formed in the casing 133. At its outer end the projection 131 is formed with an upturned portion 135 which extends through an arcuate slot 136 in the casing communicating with the groove 132. Otherwise the construction is identical with that hereinbefore described. By the operator engaging with his finger the projecting end of the upturned portion 135 the ring dial may be rotated accurately to position the zero mark of the graduations thereon under the indicator hand 9.

In the modified gauge shown by Figs. 20, 21 and 22 the ring dial 137, instead of being formed with the gear teeth 111 of the ring dial 95 hereinbefore described, is formed at its periphery with a radially inwardly extending slot or recess 139 which receives an upwardly projecting pin 141. This pin is carried by a disk-like member 143 rotatably received in the bore 145 of the casing 147, this member, like the gear or pinion 113 hereinbefore described, being retained in said bore by a screw-threaded plug 123 and having a shank 117 extending through the reduced diameter portion or perforation 119 of said bore, this shank at its end exposed at the exterior of the casing being provided with a slot 121 for reception of a screw driver head so that the member 143 may be readily rotated by the operator. When rotated the pin 141, by cooperation with the lateral walls of the slot 139 in the ring dial 137, serves to rotate the latter so that the zero mark of the graduations on the same may be accurately positioned under the indicator hand 9.

It will be understood that within the scope of the appended claims wide deviations may be made from the forms of the invention described without departing from the spirit of the invention.

I claim:

1. An indicating gauge comprising a support, a dial and cooperating pivoted indicator hand carried by said support, said dial being annular, said support being formed to present a recess, in which recess said dial is received with its under side resting on a bottom surface presented by said recess and with its outer peripheral edge fitting an interior annular surface presented by said recess for rotation of said dial relative to said support coaxially of the pivot of said indicator hand, a member in said recess secured to said support having an annular portion cooperating with an upwardly facing surface of said dial adjacent its inner periphery for retaining said dial in operative relation to said surfaces of said recess, a crystal covering said recess, said dial adjacent its outer periphery carrying a series of gear teeth extending circumferentially thereof, a pinion carried by said support meshing with said gear teeth, and a manually rotatable part exposed at the exterior of said support for rotating said pinion.

2. An indicating gauge comprising a support, a dial and cooperating indicator hand carried by said support, said dial being in the form of a substanially flat annular ring, said support being formed to present a recess having a circular peripheral wall and a flat bottom portion, in which recess said annular dial is removably rotatably received with its under side resting on said flat bottom portion and with its outer peripheral edge fitting said peripheral wall, said support being also formed to present on the bottom of said recess a raised portion surrounded by said dial, a substantially flat disk at the center portion of said recess resting on said raised portion and removably secured thereto, which disk adjacent its periphery overlies said annular dial adjacent its inner peripheral edge for retaining said dial in said recess, a crystal carried by said support above said dial and disk for covering said recess, the outer peripheral edge portion of said dial being formed with gear teeth, said support having a second recess opening laterally into the first mentioned recess, a pinion rotatably mounted in said second recess and meshing with said gear teeth of said dial for rotating the latter relative to said support, and means comprising a manually rotatable head operatively exposed at the exterior of said support for rotating said pinion.

3. An indicating gauge comprising a support formed with a recess, a crystal covering said recess, said recess having a central portion of reduced depth, a bridge-piece in said recess spaced from the bottom of said central portion thereof, a center pinion and driving gear therefor in said central portion of said recess beneath said bridge-piece and journalled on the latter, which center pinion operatively carries an indicating hand, an annular dial in said recess beneath said hand cooperating with the latter, which dial is supported on the upper side of said bridge-piece for rotative adjustment relative to said hand, a part carried by said bridge-piece overlying the inner peripheral edge portion of said dial for retaining it on said bridge-piece, a manually rotatable part readily accessible from the exterior of said support, and a connection between said part and dial for rotating the latter when said part is rotated.

WARREN AMES.

REFERENCES CITED

The following references are of record in the file of this patent:

UNITED STATES PATENTS

| Number | Name | Date |
|---|---|---|
| Re. 19,079 | Kollsman | Feb. 13, 1934 |
| Re. 19,709 | Peace, Jr. | Sept. 17, 1935 |
| 1,812,549 | Peace, Jr. | June 30, 1931 |
| 1,862,008 | Crocker | June 7, 1932 |
| 2,019,132 | Hansen | Oct. 29, 1935 |
| 2,165,017 | Sisson | July 4, 1939 |
| 2,178,745 | Emery | Nov. 7, 1939 |
| 2,336,695 | Maurer | Dec. 14, 1943 |